June 17, 1941.　　　R. TRÖGER　　　2,246,150
ELECTRIC VALVE CIRCUIT
Original Filed June 2, 1937
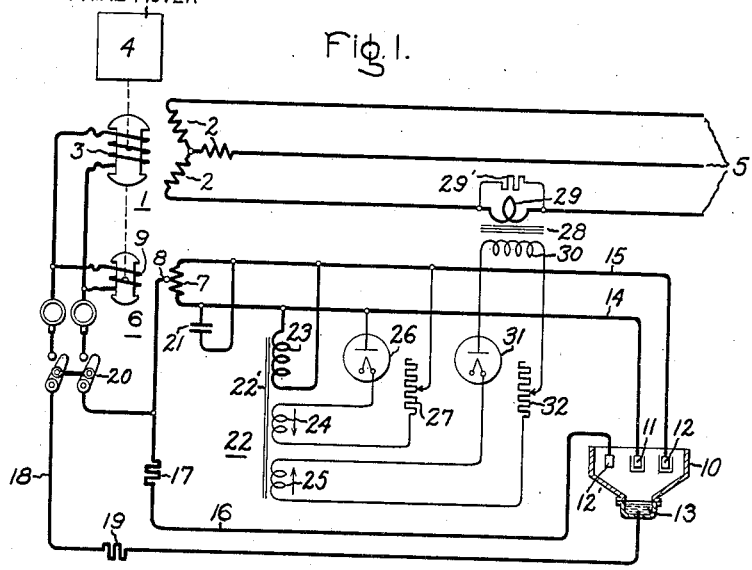
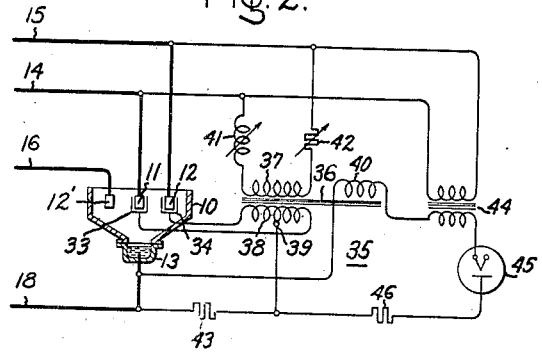
Inventor:
Richard Tröger,
by Harry E. Dunham
His Attorney.

Patented June 17, 1941

2,246,150

UNITED STATES PATENT OFFICE 2,246,150

ELECTRIC VALVE CIRCUIT

Richard Tröger, Berlin-Zehlendorf-Mitte, Germany, assignor to General Electric Company, a corporation of New York Original application June 2, 1937, Serial No. 146,096. Divided and this application April 22, 1939, Serial No. 269,403. In Germany June 11, 1936

5 Claims. (Cl. 175—363)

My invention relates to electric valve control systems and more particularly to control circuits for electric valve apparatus.

This application is a division of my copending application Serial No. 146,096, entitled "Regulating system," filed June 2, 1937 and assigned to the assignee of the present application.

In electric valve control and regulating systems, such as control and regulating systems for dynamo-electric machines, it is frequently important to provide means for stabilizing the regulating action of the controlling system to prevent wide ranges or variations in the electrical quantity or operating condition to be maintained. More specifically, in order to utilize the full advantages incident to the use of regulating systems entirely electrical in nature and operation, it is important to provide stabilizing means to maintain the electrical condition to be regulated within predetermined narrowly defined limits. Furthermore, it has been found that these stabilizing or anti-hunting arrangements must be capable of responding within very short intervals of time to modify the effect of the regulating elements of the system which tend to compensate for rapidly varying load conditions.

It is an object of my invention to provide a new and improved electric valve circuit.

It is another object of my invention to provide a new and improved control or excitation system for electric valve means.

It is a further object of my invention to provide a new and improved stabilizing system for electric valve regulating apparatus.

In accordance with the illustrated embodiment of my invention, I provide an electric valve regulating system for controlling the excitation of a field circuit of a dynamo-electric machine of the synchronous type in accordance with a predetermined electrical condition, such as the voltage or the current of the armature winding of the machine. The field winding is variably energized by means of electric valve apparatus of the controlled type having a control member for controlling the current conducted thereby. The control or excitation circuit is responsive to the armature voltage of the synchronous machine and comprises apparatus for varying the phase impressed on the control member in response to the armature voltage, and also includes means for simultaneously varying a unidirectional biasing potential impressed on the control member. The latter voltage acts as a stabilizing voltage to prevent hunting and hence controls the energization of a field winding of the dynamo-electric machine to maintain the voltage thereof within narrowly defined limits under varying load conditions. The stabilizing circuit includes a saturable transformer for impressing on the control member an alternating voltage variable in phase with respect to the anode-cathode voltage, and also includes an impedance element for impressing on the control member a negative unidirectional biasing potential which also assists in the control of the electric valve means. The stabilizing circuit also includes a transformer and a unidirectional conducting device which energizes the impedance element and controls the saturable transformer to control the conductivity of the electric valve means in accordance with the voltage impressed thereacross.

For a better understanding of my invention, reference may be had to the following description taken in connection with the accompanying drawing, and its scope will be pointed out in the appended claims. Fig. 1 of the drawing diagrammatically represents an embodiment of my invention disclosed and claimed in my above identified copending application, and Fig. 2 diagrammatically shows my invention as applied to the arrangement of Fig. 1.

Referring to Fig. 1 of the accompanying drawing, there is diagrammatically shown an excitation system for a dynamo-electric machine 1 of the synchronous type having an armature winding 2 and a field winding 3. Although not limited thereto, I have chosen to represent my invention, claimed in the above identified application, as applied to a dynamo-electric machine of the synchronous type which is operating as a generator driven by a suitable prime mover 4. An alternating current circuit 5 is connected to the armature windings 2 of machine 1.

An excitation system for the dynamo-electric machine 1 includes a self-excited synchronous alternating current generator 6 having an armature winding 7 provided with a neutral connection 8 and a field winding 9. The self-excited generator 6 may be arranged to be driven by the prime mover 4 and the field structure of generator 6 may be mounted on the same shaft with the field structure of the dynamo-electric machine 1. To supply direct current to the field winding 9 of generator 6 and to supply direct current to the field winding 3 of dynamo-electric machine 1, I employ an electric valve means 10 having anodes 11 and 12 and a cathode 13. The electric valve means 10 may be of the type employing an ionizable medium, such as a gas or a vapor, and may include an auxiliary anode 12'.

Anodes 11 and 12 are connected to the terminals of armature winding 7 through conductors 14 and 15 and the auxiliary anode 12' is connected to the neutral connection 8 of armature winding 7 through a conductor 16 and a current limiting resistance 17. Cathode 13 is connected to the field circuits for dynamo-electric machine 1 and generator 6 through a conductor 18 and resistance 19. A switch 20 may be interposed between the excitation system and the field windings 3 and 9. A capacitance 21 is connected across the terminals of armature windings 7 of the self-excited generator 6 to consume a leading quadrature current from the generator 6, thereby establishing in the generator 6 a magnetomotive force which tends to assist the field magnetomotive force provided by field winding 9.

To control the voltage of the synchronous generator 6 and hence to control the energization of the field winding 3 of dynamo-electric machine 1 in accordance with a predetermined controlling influence of the machine 1, such as the armature current thereof, I provide a variable impedance inductive device 22 having a core member 22', a winding 23 connected across armature winding 7 of generator 6 and having control windings 24 and 25. The control windings 24 and 25 establish opposing magnetomotive forces which act on the core member 22'; and the control winding 24 is energized in accordance with a predetermined electrical condition such as the armature voltage of the generator 6. The control winding 24 tends to saturate core member 22' and the energization of control winding 24 is effected through a unidirectional conducting device 26 and a serially connected adjustable current controlling resistance 27. The energization of the control winding 25 is controlled in accordance with a predetermined electrical condition, such as the armature current, of machine 1. A suitable inductive device, such as a current transformer 28 having a primary winding 29 and a secondary winding 30, supplies a voltage which varies in accordance with the armature current of machine 1 and effects energization of control winding 25 through a unidirectional conducting device 31 and an adjustable current controlling resistance 32. A resistance 29' may be connected across the primary winding of current transformer 29 to limit the voltage impressed thereacross.

The operation of the system diagrammatically shown in Fig. 1 will be explained when the dynamo-electric machine 1 is operating as a synchronous generator to transmit energy to the alternating current circuit 5 and when the excitation system including the self-excited synchronous generator 6 is operating to control the energization of field winding 3 of machine 1 in accordance with a predetermined condition such as the armature current of machine 1 to maintain the armature voltage thereof substantially constant. As will be well understood by those skilled in the art, direct current will be supplied to primary winding 3 of machine 1 and field winding 9 of generator 6 from armature winding 7 of generator 6 through the electric valve means 10. The capacitance 21 will absorb a leading quadrature current from the armature winding 7 of machine 6 to provide a magnetomotive force tending to assist that furnished by field winding 9. The capacitance 21 also serves to initiate the build-up of the excitation of the generator 6. It is understood that the leading quadrature current absorbed by the capacitance 21 establishes a magnetomotive force tending to assist that due to field winding 9, and during the initiating stage of the building up of the excitation of generator 6 the residual magnetism of the field structure of generator 6 and the assisting action of capacitance 21 will increase the armature voltage to a value sufficient to initiate discharges within the electric valve means 10 to supply direct current to field winding 9 of generator 6 and to field winding 3 of dynamo-electric machine 1. It is also to be noted that the lagging quadrature current consumed by the variable inductive device 22 tends to establish a magnetomotive force opposing that due to the field winding 9 of generator 6, but during the starting operation when the armature voltage of the generator 6 is small the energization of control winding 24 will be correspondingly small so that the lagging quadrature current consumed by winding 23 will not be appreciable.

The energization of the field winding 3 of dynamo-electric machine 1 and hence the armature voltage of machine 1 will be controlled in accordance with the energy transmitted to the alternating current circuit 5 by the machine 1. The variable impedance inductive device 22 will absorb variable amounts of lagging quadrature current from the armature winding 7 of synchronous generator 6 to control the armature voltage thereof in accordance with the current transmitted by the dynamo-electric machine 1 to circuit 5. Resistance 27 is adjusted so that the effect of control winding 24 is normally predominating to cause saturation of core member 22' and resistance 32 is adjusted so that control winding 25 furnishes an opposing magnetomotive force of somewhat lesser value than that provided by control winding 24. Let it be assumed that the excitation system is arranged to maintain the armature voltage of the dynamo-electric machine 1 at a substantially constant value and furthermore let it be assumed that the load or armature current of the machine 1 temporarily increases. As a result of this increase in armature current, the voltage supplied by the current transformer 28 will also increase to effect an increase in the energization of control winding 25, thereby decreasing the degree of saturation of the core member 22' of the inductive device 22. Under this condition, winding 23 will absorb a smaller amount of lagging quadrature current from the armature winding 7 of generator 6 and the armature voltage of generator 6 will be increased. Due to this increase in armature voltage there will be effected an increase in the value of the direct current supplied to field winding 3 of dynamo-electric machine 1 by electric valve means 10 tending to restore the armature voltage of dynamo-electric machine 1 to the predetermined value. On the other hand, if the load or armature current of dynamo-electric machine 1 decreases to a value below a predetermined value or below a predetermined range of values, the energization of control winding 25 will be decreased to effect an increase in the saturation or magnetization of the core member 22' of inductive device 21 to cause winding 23 to absorb a larger amount of lagging quadrature current from armature winding 7 of generator 6. This increase in lagging quadrature current will effect a reduction in the armature voltage of generator 6 and will thereby reduce the voltage impressed on electric valve means 10 to decrease the excitation of dynamo-electric machine 1 to restore the armature terminal voltage thereof to the predetermined value to be maintained.

The variable impedance inductive device 22 not only effects control of the armature voltage of the generator 6 to control the excitation of the field winding 3 of dynamo-electric machine 1, but this variable impedance device also responds in a manner to prevent hunting of the system and to stabilize the regulation thereof. More specifically, since the variable impedance inductive device 22 is operated within the saturated region of the magnetic core structure 22′, the compensating voltage variations of the generator 6 are maintained within a predetermined range of variations during the regulating operation. The changes in energization of the control windings 24 and 25 will not effect proportionate changes in the armature voltage of the generator 6 due to the saturation effects of the variable impedance device 22. While the device 22 is effective to maintain the voltage of the dynamo-electric machine 1 within a predetermined range of values or at a predetermined value under varying load conditions, the regulating action is stabilized to prevent hunting of the armature voltage of the machine 1. The auxiliary or neutral point anode 12′ of electric valve means 10 also serves as a stabilizing means for the excitation system under varying load conditions.

In Fig. 2 of the accompanying drawing there is diagrammatically shown an embodiment of my invention for controlling the conductivities of the discharge paths of electric valve means 10 in order to stabilize further the action of the variable impedance inductive device 22. The conductivities of the associated discharge paths are controlled by means of control members 33 and 34 on which are impressed variable voltages to effect the stabilizing action. In order to impress on the control members 33 and 34 an alternating voltage controllable in accordance with a predetermined electrical condition such as the voltage of the armature winding 7 of generator 6, I provide a stabilizing circuit 35. The circuit 35 includes a saturable inductive device or transformer 36 having a primary winding 37, a secondary winding 38 with an electrically intermediate connection 39 and a control winding 40 to control the magnetization or saturation of the core structure thereof. A variable inductance 41 and a variable resistance 42 may be connected in series relation with primary winding 37 of transformer 36 to control the phase of the alternating voltage impressed on primary winding 37. It will be understood by those skilled in the art that I may employ any well known phase shifting arrangement, either manually operated or automatically operated, to control the phase of the alternating voltage impressed on the primary winding 37 of transformer 36 to effect control of the energization of the field winding 3 of machine 1 under varying load conditions. An impedance element, such as a resistance 43, is connected in circuit with secondary winding 38 and the control members 33 and 34 of electric valve means 10. More particularly, the resistance 43 is connected between cathode 13 and the connection 39 of winding 38. As a means for controlling the energization of the control winding 40 of transformer 36 and as a means for supplying to resistance 43 a variable unidirectional current, I provide a transformer 44 and a unidirectional conducting device 45. A current controlling resistance 46 may be connected in series relation with a secondary winding of transformer 44 and unidirectional conducting device 45. The unidirectional conducting device 45 is arranged so that the voltage appearing across resistance 43 tends to impress on control members 33 and 34 of electric valve means 10 a negative unidirectional biasing potential to assist in the control of the conductivity of the associated discharge paths.

The operation of the stabilizing circuit 35 shown in Fig. 2 will be explained by considering the system of Fig. 1 when the arrangement thereof is operating to control the voltage of the dynamo-electric machine 1 under variable load conditions. The alternating voltage impressed on control members 33 and 34 of electric valve means 10 is adjusted in phase by inductance 41 and resistance 42 so that the requisite amount of direct current is supplied to field winding 3 from armature winding 7 of generator 6 through electric valve means 10. Upon increase of the armature current of dynamo-electric machine 1, as explained above, the excitation system will respond to increase the value of direct current supplied to the field winding 3. The stabilizing arrangement of Fig. 2 will respond to prevent over-shooting or, in other words, to stabilize the regulating action of the variable impedance inductive device 22 of Fig. 1. When the impedance of winding 23 of inductive device 22 is decreased under these conditions, the voltage impressed on anodes 11 and 12 through conductors 14 and 15 will of course increase to effect an increase in the value of direct current transmitted to the field winding 3. By virtue of this increase in armature voltage of generator 6, the energization of control winding 40 of transformer 36 will be increased to effect a retardation in phase of the alternating voltage supplied by secondary winding 38. Furthermore, there will be an increase in the value of the unidirectional current supplied to the resistance 43 by transformer 44 and unidirectional conducting device 45 to increase the value of the negative unidirectional biasing potential impressed on control members 33 and 34. These two effects, acting simultaneously or concurrently, retard the voltage impressed on control members 33 and 34 relative to the armature voltages impressed on anodes 11 and 12 to decrease temporarily the conductivities of the associated arc discharge paths to limit the value of the direct current transmitted to field winding 3 of machine 1. In this way the circuit 35 stabilizes the regulation of the excitation system. Of course, it is to be understood that when the load or armature current of dynamo-electric machine 1 decreases, the excitation system and the stabilizing circuit will respond to prevent the voltage of the dynamo-electric machine 1 from swinging below the predetermined value of armature voltage of the machine to be maintained.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination, an alternating current circuit, a direct current circuit, apparatus for interconnecting said first mentioned circuits comprising electric valve means having a discharge path and a control member for controlling the conductivity thereof, an excitation circuit for energizing said control member including a source of alternating voltage and means for producing a control voltage variable in phase, an impedance element connected in circuit with said control member for impressing thereon a bias potential, and means comprising a rectifier for controlling the phase of said control voltage and the magnitude of said bias potential in accordance with an electrical condition of said alternating current circuit.

2. In combination, an alternating current circuit, a direct current circuit, apparatus for interconnecting said first mentioned circuits comprising electric valve means having a discharge path and a control member for controlling the conductivity thereof, and an excitation circuit including a saturable transformer having a primary winding energized from said alternating current circuit, a secondary winding for impressing on said control member an alternating voltage and a tertiary winding for controlling the phase of said alternating voltage, an impedance element connected in circuit with said secondary winding and said control member for impressing thereon a negative unidirectional bias potential and means for energizing said tertiary winding to control the phase of said alternating voltage and the magnitude of said negative bias potential in accordance with the voltage of said alternating current circuit.

3. In combination, an alternating current circuit, a direct current circuit, electric translating apparatus connected between said circuits and comprising an electric valve means having a control member for controlling the conductivity thereof, a control circuit for energizing said control member comprising phase shifting means including a saturable inductive device for controlling the phase of the voltage impressed upon said control member with respect to the voltage of said alternating current circuit, and means including a unidirectional conducting device responsive to the voltage of said alternating current circuit for concurrently controlling said saturable inductive device and for impressing on said control member a unidirectional biasing potential.

4. In combination, an alternating current circuit, a direct current circuit, electric translating apparatus connected between said circuits and comprising electric valve means including a control member for controlling the conductivity thereof, a control circuit for energizing said control member comprising a saturable inductive device for impressing on said control member an alternating voltage variable in phase with respect to the voltage of said alternating current circuit and including a control winding, and means for variably energizing said control winding and for impressing on said control member a unidirectional biasing potential variable in accordance with the voltage of said alternating current circuit.

5. In combination, an alternating current circuit, a direct current circuit, electric translating apparatus connected between said circuits and comprising electric valve means having a control member for controlling the conductivity thereof, an excitation circuit comprising phase shifting means including a saturable inductive device for impressing on said control member a voltage variable in phase with respect to the voltage of said alternating current circuit, and a stabilizing circuit comprising means including a unidirectional conducting device for simultaneously controlling said saturable inductive device and for impressing on said control member a variable negative unidirectional biasing potential.

RICHARD TRÖGER.